US006507354B1

(12) United States Patent
Sato

(10) Patent No.: US 6,507,354 B1
(45) Date of Patent: Jan. 14, 2003

(54) IMAGE FORMING APPARATUS WITH A WRITING LASER POWER CONTROL

(75) Inventor: Masumi Sato, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/520,367

(22) Filed: Mar. 7, 2000

Related U.S. Application Data

(63) Continuation of application No. 09/083,965, filed on May 26, 1998, now Pat. No. 6,104,419.

(30) Foreign Application Priority Data

| May 26, 1997 | (JP) | 9-135314 |
| Jun. 13, 1997 | (JP) | 9-172845 |
| Apr. 24, 1998 | (JP) | 10-114781 |

(51) Int. Cl.[7] .................... B41J 2/385; G03G 13/04
(52) U.S. Cl. ........................... 347/131; 347/133
(58) Field of Search ................. 347/131, 133, 347/253, 252, 240, 237, 247

(56) References Cited

U.S. PATENT DOCUMENTS 4,803,497 A * 2/1989 Kennedy, Jr. et al. ...... 347/253
5,805,192 A * 9/1998 Sato .......................... 347/133

* cited by examiner

Primary Examiner—Lamson Nguyen
(74) Attorney, Agent, or Firm—Oblon, Spivak, McClelland, Maier & Neustadt, P.C.

(57) ABSTRACT

An image forming apparatus which writes an electrostatic image onto a photoconductor by laser light. An image writing resolution is set and a controller controls writing laser power according to the set image writing resolution. The controller also controls the writing laser power for a high resolution mode to be greater than the writing laser power for a low resolution mode.

6 Claims, 6 Drawing Sheets

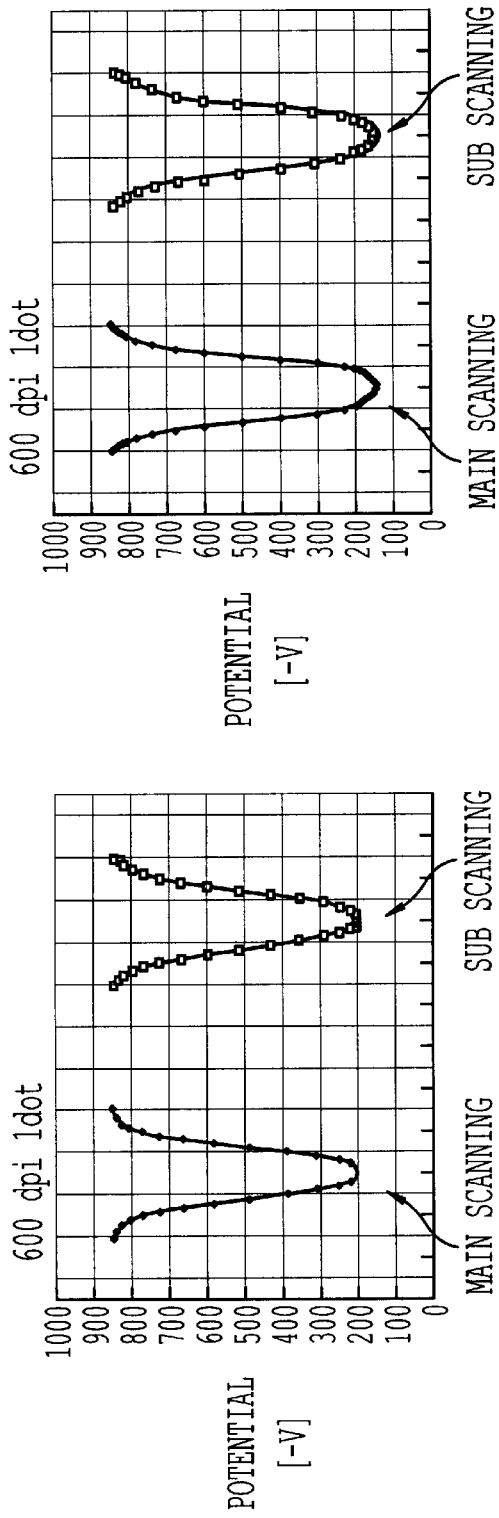
FIG.3b
FIG.3a
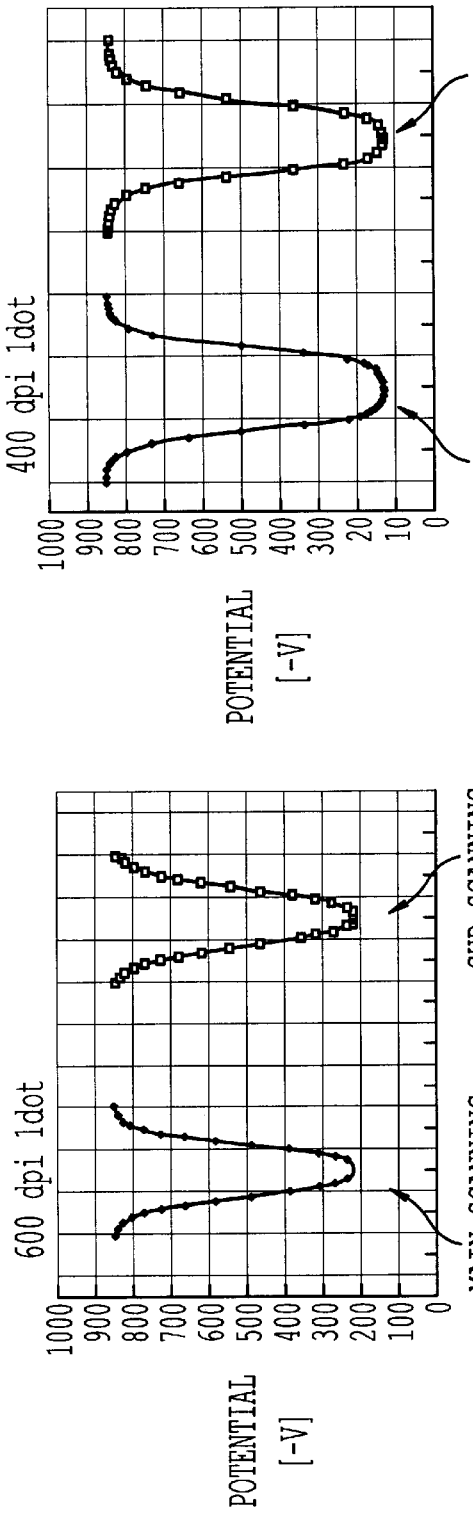
FIG.3d
FIG.3c

IMAGE FORMING APPARATUS WITH A WRITING LASER POWER CONTROL

This application is a continuation of Ser. No. 09/083,965, entitled "Image Forming Apparatus with a Writing Laser Power Control" dated May 26, 1998, now U.S. Pat. No. 6,104,419.

BACKGROUND OF THE INVENTION

1. Field of the Invention

The present invention relates to an image forming apparatus such as a copier, a printer, a fax, a multi-function apparatus which includes at least some of these functions, etc., with a writing laser power control.

2. Discussion of the Background Art

An image forming apparatus with a writing laser power controller is disclosed in, for example, JOP2-79060, JOP5-197263 and JOP58-121145. Such disclosed image forming apparatus with a writing laser power controller have a function of multi-resolution and can change writing resolution by changing a frequency of a pixel clock and a rotating speed of a polygon mirror. Or to put it another way, in such apparatus a scanning speed of exposure to light and a rotating speed of a photoconductor can be changed.

In such apparatus, energy of the exposure to light is maintained uniformly. To be more specific, when a rotating speed of a photoconductor is reduced by a half, for example, for changing a resolution, the amount of light for exposure is also reduced by a half. And when only the scanning speed of exposure to light is changed without changing the rotating speed of the photoconductor, the amount of light for exposure is not changed because energy of the exposure to light is not changed.

A copy machine is required to form a high quality image output for several different image types, e.g. a textual image and a photo image including halftones, and therefore, a copy machine may have a one dot multi-level image mode for an image forming function. A one dot multi-level image mode means that an image is formed of many dots and each dot is formed of multi-levels.

On the other hand, a printer is required to form a high quality output of a textual image, and therefore, a printer may have an output function by high resolution and binary dots. For example, for a normal mode resolution is 400 dpi, and for a high resolution mode resolution is 600 dpi, and the dots are binary dots.

And a multi-function apparatus which includes a copy function and a printer function may have an image forming function by the one dot multi-level and the binary dot image operations. However, in a typical multi-function apparatus, an energy of exposure to light is set for the one dot multi-level image to output a high quality image for a photo image including halftones.

FIG. 2 shows a relationship of energy of an exposure to light relative to a potential of a photoconductor. In forming an image by a one dot multi-level operation, an exposure potential is ⅕–¹⁄₁₀ of a charged potential. In FIG. 2, when the energy of the exposure to light is 4 erg/cm² (point A), an exposure potential (−135V) is about ⅐ of a charged potential (−925V). Therefore, when the maximum energy of the exposure to light is controlled to 4 erg/cm², the exposure potential is ⅕–¹⁄₁₀ of a charged potential.

However, an image forming apparatus which has an exposure system as just described has some problems. For example, in a multi-resolution image forming apparatus which has two resolution modes, e.g. a normal resolution mode (400 dpi) and a high resolution mode (600 dpi), when a frequency of a pixel clock is changed to 1.5 times of 400 dpi and set 600 dpi, energy of the exposure to light is maintained uniformly without changing an amount of light. Therefore, in solidly shaded areas the exposure potential is the same as for 400 dpi and the same image density can be output. However, in one dot, because an energy of the exposure is ⅔ of energy of the exposure for 400 dpi and a peak level is low, an isolated one dot image and a one dot line image are formed as low density and poor quality images.

To prevent this problem, there is a way to change a diameter of the light in the case of the 400 dpi and 600 dpi, and the amount of the light is changed to maintain uniformity. However, this operation cannot be executed easily because the operation of changing a diameter of the light system requires a high cost.

There is another problem when forming an image by binary dots also. An image forming operation is not stable by small fluctuations of amounts of light and characteristics of a photoconductor.

SUMMARY OF THE INVENTION

Accordingly, one object of the present invention is to overcome the noted and other drawbacks in the background art.

Accordingly, an object of the present invention is to provide a novel image forming apparatus which has a writing laser power controller which writes an electrostatic image on a photoconductor by laser light, a resolution changing mechanism changing an image writing resolution, and a controller controlling a writing laser power according to a set image writing resolution and controlling writing laser power for high resolution to be greater than writing laser power for low resolution.

To achieve this and other purposes, the present invention writes an electrostatic image on a photoconductor by laser light, sets a writing mode, which can be a one dot multi-level image mode or a binary dot image mode, according to the type of image to be formed, and controls writing laser power according to the set writing mode such that the writing laser power for the binary dots image mode is greater than the writing laser power for the one dot multi-level image mode.

BRIEF DESCRIPTION OF THE DRAWINGS

A more complete appreciation of the present invention and many of the attendant advantages thereof will be readily obtained as the same becomes better understood by reference to the following detailed description -when considered in connection with the accompanying drawings, wherein:

FIGS. 3(a)–3(d), 4(a)–4(d), 5(a)–5(d) and 6(a)–6(d) are diagrams of simulations of writing by an image forming apparatus according to the present invention.

DESCRIPTION OF THE PREFERRED EMBODIMENTS

Figure 1:
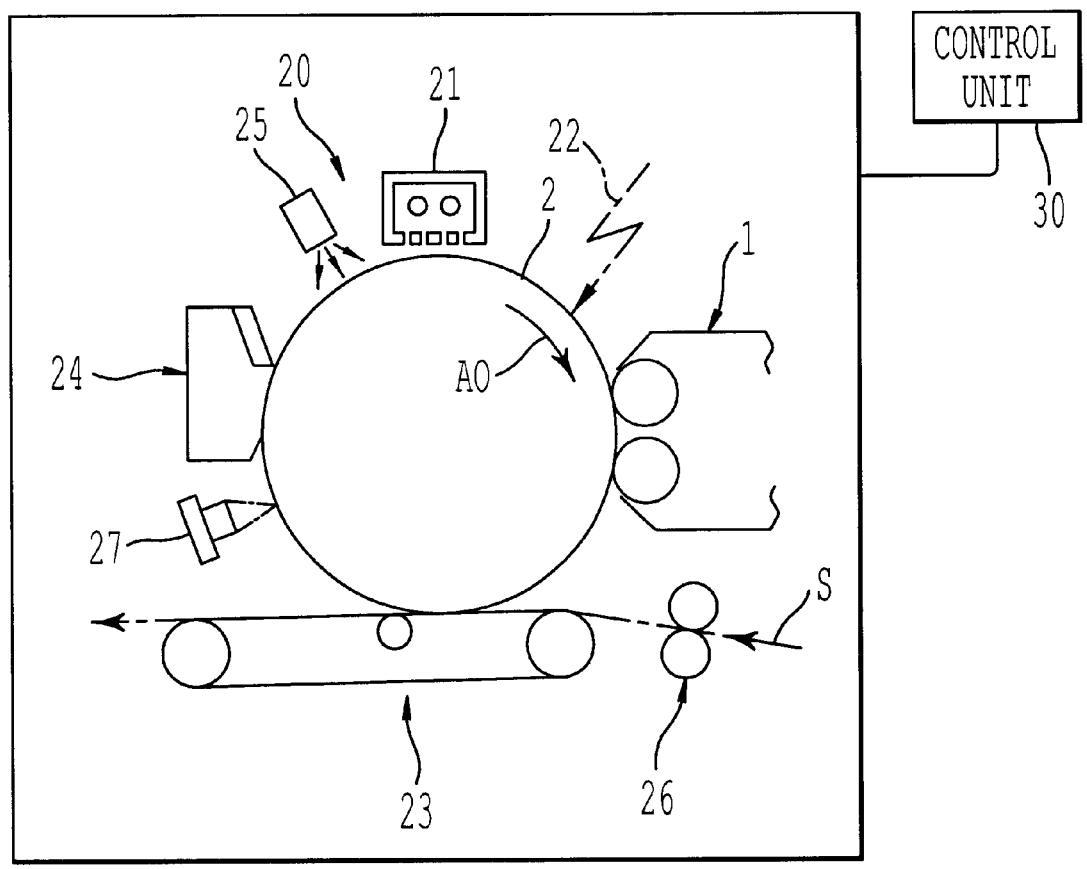
FIG. 1 is a diagram of an image forming apparatus according to the present invention.

Referring now to the drawings, wherein like reference numerals designate identical or corresponding parts throughout the several views, FIG. 1 is a diagram of an image forming apparatus according to the present invention. In FIG. 1, an image forming apparatus 20 includes a photoconductive drum 2 which rotates in direction AO, a charger 21 which charges the photoconductive drum 2, a developer 1 which develops an electrostatic image formed on the photoconductive drum 2 by toner, a transfer unit 23 which transfers a toner image formed on the photoconductive drum 2 to a recording paper, and a cleaning unit 24 which cleans the photoconductive drum 2. A control unit 30 controls each unit of the image forming apparatus 20.

In this image forming apparatus 20, for an image forming operation, first, the charger 21 charges the photoconductive drum 2 uniformly. A laser light 22 from a writing unit which includes a laser diode then selectively exposes the charged photoconductive drum 2 based on an image signal, and thereby forms an electrostatic image on the photoconductive drum 2. The electrostatic image on the photoconductive drum 2 is then developed by the developer 1, and a developed toner image is then transferred to the recording paper S. The recording paper S is fed to the transfer unit 23 at an appropriate timing by a resist roller 26. The toner image on the recording paper S is then fused on the recording paper S by a finisher (not shown).

Residual toner remaining on the photoconductive drum 2 after transferring by the transfer unit 23 is cleaned by the cleaning unit 24. And a residual electrical charge on the photoconductive drum 2 after transferring is discharged by a discharge unit 25 which may include a discharge lamp. A sensor 27 detects a density of the residual toner on the photoconductive drum 2.

In this image forming apparatus 20, the charger 21 charges the photoconductive drum 2 negatively, for example. The developer 1 includes a developing compound which includes toner and carrier, and the toner is also charged negatively in this example. A transfer bias of the transfer unit 23 is then positive, in this example.

Figure 2:
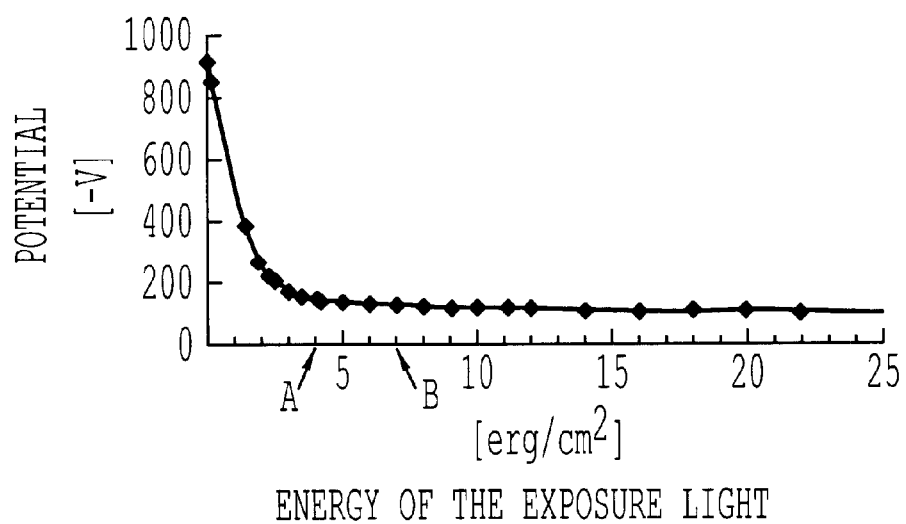
FIG. 2 is a diagram of a relationship of energy of exposure to light relative to a potential of a photoconductor.

FIG. 2 again is a diagram of a relationship of energy of an exposure to light relative to potential of a photoconductor. With reference to FIG. 2 a laser writing unit can write by 4 erg/cm$^2$ (indicated at A) in a 400 dpi mode. In this writing, a size of a writing beam can be 72 $\mu$m (main scanning direction)×89 $\mu$m (sub-scanning direction).

In this image forming apparatus 20, the control unit 30 controls image formation, which includes a writing operation. The control unit 30 includes a CPU and ROM, and control of the control unit 30 is executed by the CPU according to a program stored in the ROM.

FIGS. 3, 4, 5 and 6 are diagrams of simulations of writing in certain conditions. FIGS. 3(a), 3(b), 3(c) and 3(d) show the distribution of a potential of an electrostatic image of an isolated one dot image. FIGS. 4(a), 4(b), 4(c) and 4(d) show the distribution of a potential of an electrostatic image of a one dot line extending in a same direction as a main scanning direction. FIGS. 5(a), 5(b), 5(c) and 5(d) show the distribution of a potential of an electrostatic image of a one dot line extending in a same direction as a sub-scanning direction. FIGS. 6(a), 6(b), 6(c) and 6(d) show the distribution of a potential of an electrostatic image of a solidly shaded image.

FIGS. 3, 4, 5 and 6 show cases of writing in a 600 dpi mode under certain conditions relative to conditions in a 400 dpi mode. In FIGS. 3, 4, 5 and 6, the Figures (a) show a case when a writing laser power is 1.5 times of a writing laser power in a case of a 400 dpi mode and a size of the laser light is ⅔ of a size of laser light in the 400 dpi mode. The Figures (b) show a case when the writing laser power is 1.5 times of the writing laser power in the case of the 400 dpi mode and the size of the laser light is the same size as the size of laser light in the 400 dpi mode. The Figures (c) show a case when the writing laser power and the size of laser light is the same as in the 400 dpi mode (previously known case). The Figures (d) show the case of the 400 dpi mode.

In these FIGS. 3, 4, 5 and 6 values indicate size of an electrostatic image when a developing bias is −550V and at peak potential.

The diagrams of FIG. 3 show that in the case of an isolated one dot image, when the image forming apparatus prints by 600 dpi under the same conditions as for 400 dpi (FIG. 3(d)), a peak potential becomes high (−141V→−228V) and an output image becomes a poor quality image with a density of a low level (FIG. 3(c)).

In FIG. 3(b), when the writing laser power is 1.5 times of the writing laser power in the case of 400 dpi, peak potential is almost at a same potential as in the case of 400 dpi (−141V→−158V), and therefore an isolated one dot image is printed with adequate density.

Moreover, when a size of the laser light is ⅔ of the size of the laser light in the case of 400 dpi, a peak potential becomes −203V and an image size in a main scanning direction becomes small (71.7 $\mu$m→56.5 $\mu$m), and therefore an image becomes more sharp (FIG. 3(a)).

Figure 4A:
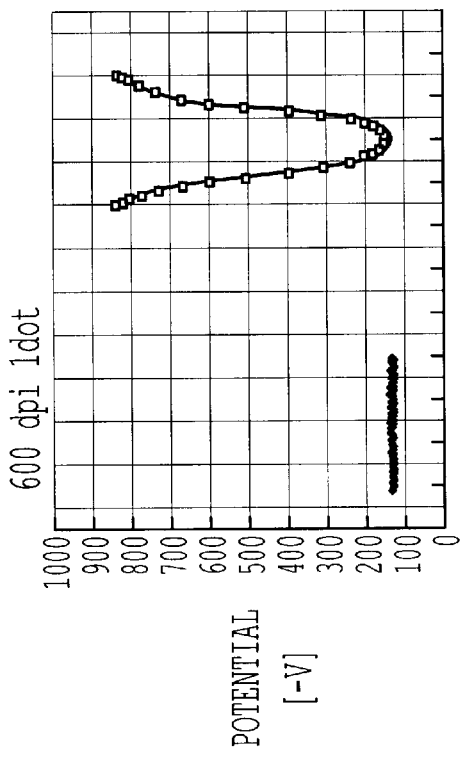
Figure 4B:
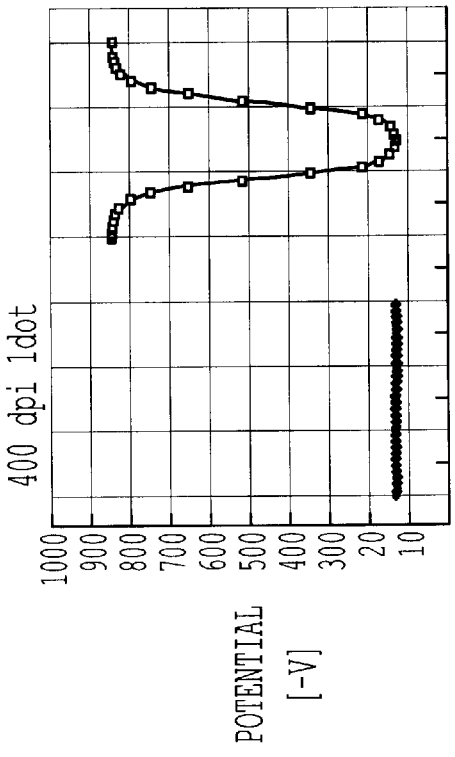
Figure 4C:
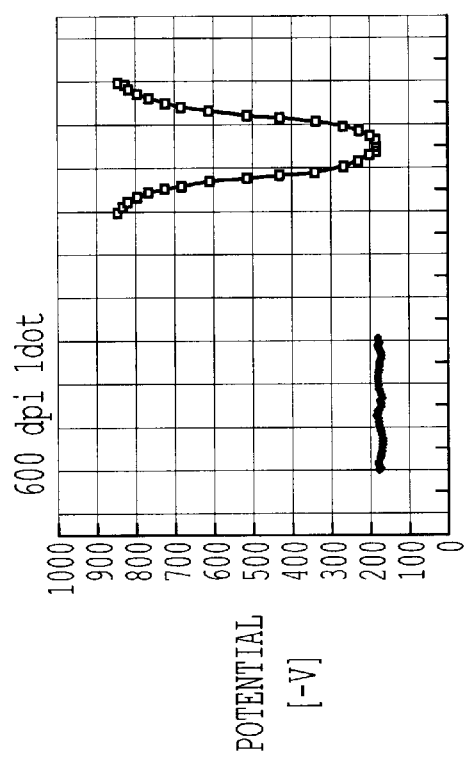
Figure 4D:
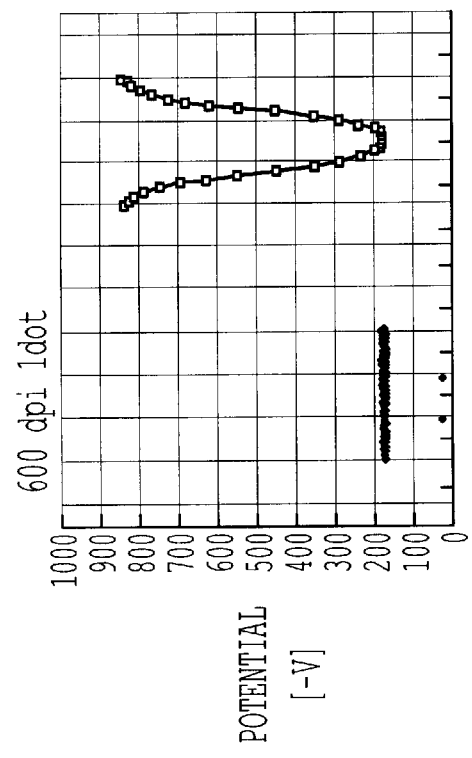

The diagrams of FIG. 4 show that in the case of a one dot line extending in a main scanning direction, when the image forming apparatus prints by 600 dpi under the same conditions as for 400 dpi (FIG. 4(d)), a peak potential becomes high (−135V→−177V)(FIG. 4(c)).

In FIG. 4(b), when the writing laser power is 1.5 times of the writing laser power in the case of 400 dpi, a peak potential is at a same potential as in the case of 400 dpi (−135V), and therefore an image is printed with adequate quality, but a line width is large (79.1 $\mu$m).

Moreover, when the size of the laser light is ⅔ of the size of the laser light in the case of 400 dpi, a peak potential becomes −173V and a line width becomes small (79.1 $\mu$m→68.7 $\mu$m) in FIG. 4(a). However, this peak potential −173V and line width 68.7 $\mu$m is almost the same as in the case of FIG. 4(c) (−177V, 67.9 $\mu$m). Therefore, in the case that the image forming apparatus forms an image which is more than two dots as a continual image in the main scanning direction, it is not necessary to implement a 1.5 times writing laser power, and only a same power as for the 400 dpi is needed.

Figure 5B:
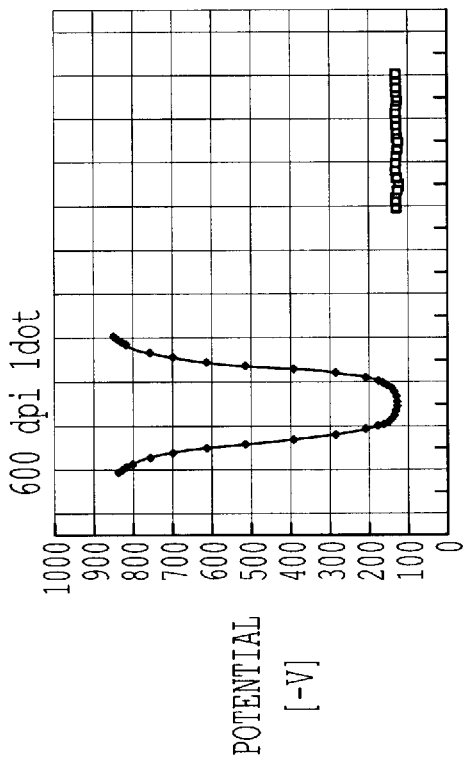
Figure 5D:
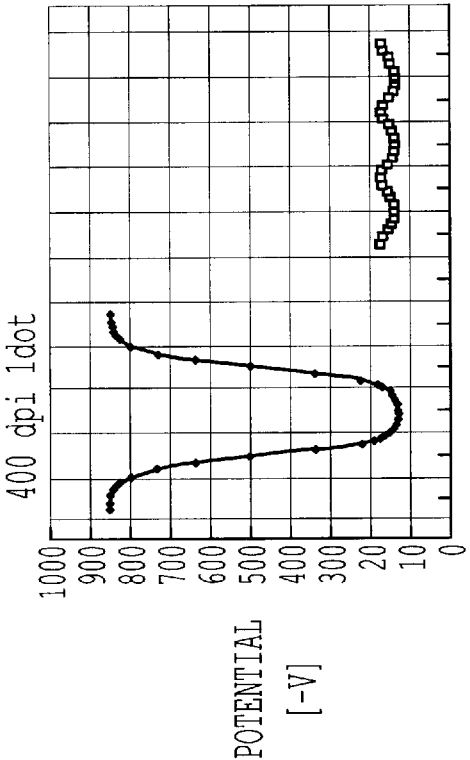
Figure 5A:
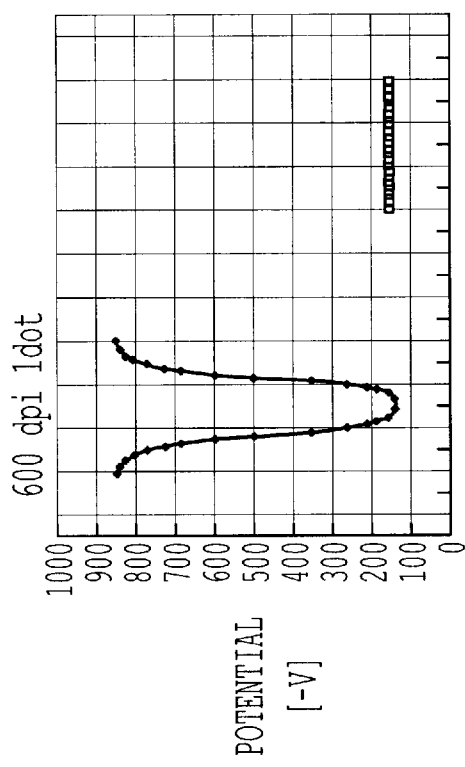
Figure 5C:
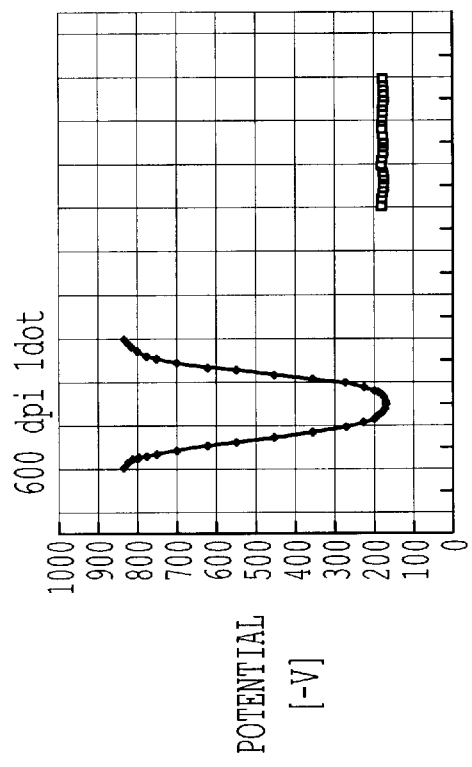

The diagrams of FIG. 5 show that in the case of a one dot line extending in a sub-scanning direction, when the image forming apparatus prints by 600 dpi under the same conditions as of 400 dpi (FIG. 5(d)), a peak potential becomes high (−139V→−175V) (FIG. 5(c)).

In FIG. 5(b), when the writing laser power is 1.5 times the writing laser power in the case of 400 dpi, a peak potential is almost the same potential as in the case of 400 dpi (−139V→−134V), and therefore an image is printed.

Moreover, when the size of the laser light is ⅔ of the size of the laser light in the case of 400 dpi, a peak potential becomes −159V and a line width becomes small (78.8 $\mu$m→64.0 $\mu$m), and therefore an image becomes more sharp in FIG. 5(a).

Figure 6B:
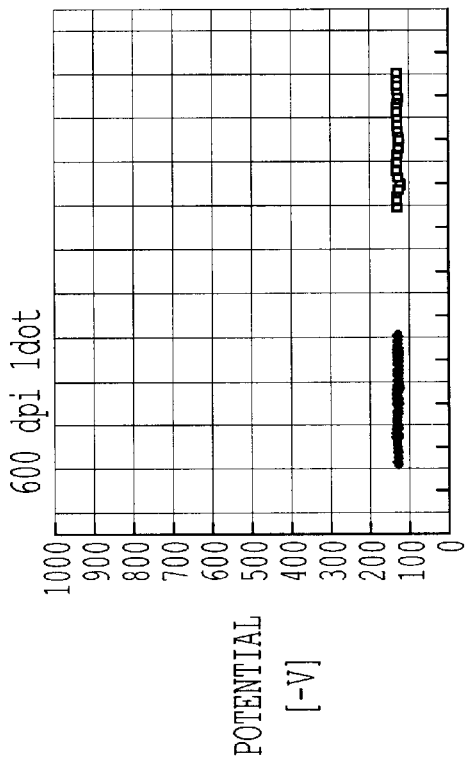
Figure 6D:
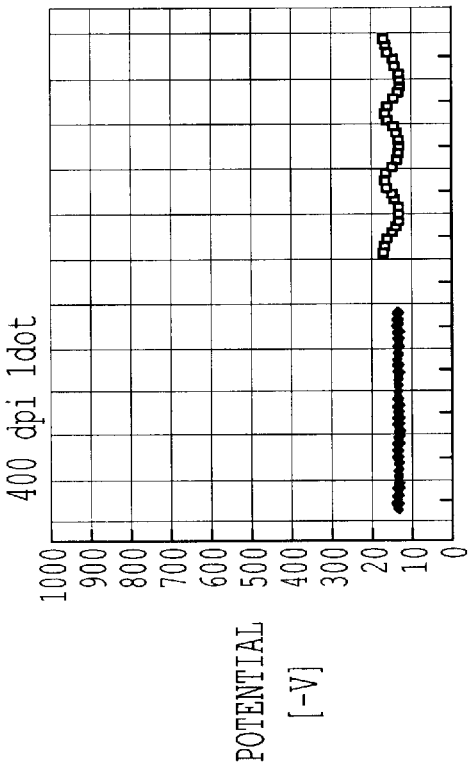
Figure 6A:
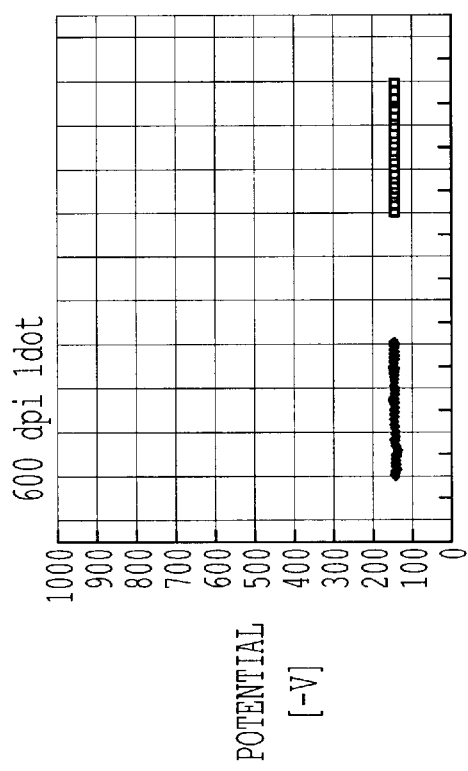
Figure 6C:
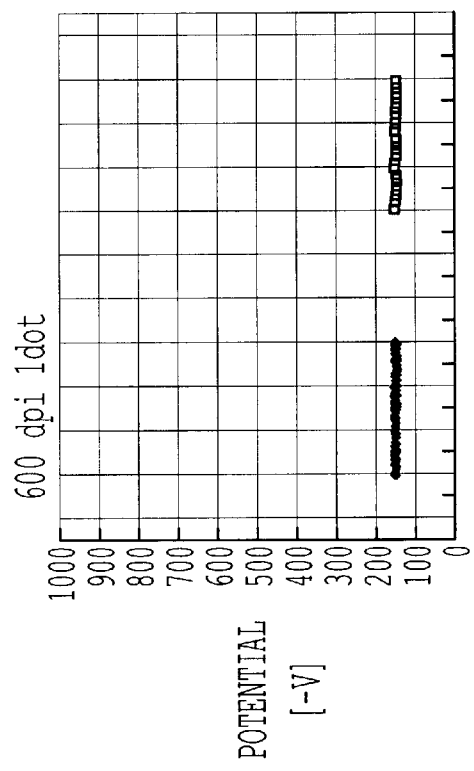

The diagrams of FIG. 6 show that in the case of a solidly shaded image, when the image forming apparatus prints by 600 dpi under the same conditions as of 400 dpi (FIG. 6(d)), a peak potential becomes high (−132V→−144V) (FIG. 6(c)).

In FIG. 6(b), when the writing laser power is 1.5 times of the writing laser power in the case of 400 dpi, a peak potential becomes low (−132V→−123V), and therefore an image is printed with adequate quality.

Moreover, when the size of the laser light is ⅔ of the size of the laser light in the case of 400 dpi, a peak potential becomes −142V and an output image is almost the same as in the case of FIG. 6(c).

It is apparent from FIGS. 3, 4, 5 and 6 that in an image forming apparatus which forms an image by 400 dpi and usually forms an image for 600 dpi by changing a scanning speed and frequency of the laser diode to 1.5 times as for 400 dpi, an energy of the exposure of one dot image becomes ⅔ and a peak of potential becomes low (FIG. 3(c) and FIG. 5(c)). Therefore, in an isolated one dot image and one dot line image, a density of an image becomes low and a printed image is of poor quality.

Consequently, the inventors of the present application have determined that when the writing laser power of 600 dpi is stronger than the writing laser power for 400 dpi, an isolated one dot image and one line image is printed with adequate density in 600 dpi also. In this case, when the writing laser power for 600 dpi is 1.5 times as in the case for 400 dpi, a peak of the potential for 600 dpi becomes the same as the peak of the potential for 400 dpi, and the image forming apparatus outputs a good quality image of both of an isolated one dot image and a solidly shaded image.

And the inventors of the present application have further determined that these diagrams further show that when the resolution value of a low resolution is expressed as "a", the laser power for low resolution is expressed as "Pa", the resolution value of high resolution is expressed as "b", and the laser power for high resolution is expressed in "Pb", the following expression shows a control for a good quality output:

$$1 < Pb/Pa \leq b/a.$$

Moreover, for an image of more than two dots of a continual image in a main scanning direction including a solidly shaded image, the image is printed with adequate quality. And when a size of laser light is ⅔ of the size of laser light in the case of 400 dpi, an image becomes more sharp.

A further embodiment of the present invention includes hardware which is the same as in the first embodiment. As noted, FIG. 2 is a diagram of a relationship of energy of an exposure to light relative to a potential of a photoconductor. For an image forming by a one dot multi-level image or in a copy mode, a laser power of a laser diode in a writing unit for exposing the photoconductive drum 2 is 4 erg/cm² (point A). When the writing unit exposes the photoconductive drum 2 with this laser power, the potential changes from −925V to −135V, which is about ⅟₇ of −925V.

For image forming by a binary dots image, the laser power of the laser diode in a writing unit for exposing the photoconductive drum 2 is 8 erg/cm² (point B). When the writing unit exposes the photoconductive drum 2 with this laser power, the potential changes from −925V to −110V, which is about ⅟₈.₅ of −925V.

It is apparent from FIG. 2 that when a maximum of energy of the exposure to light is 4 erg/cm² (point A), the exposing potential changes gradually according to the energy of the exposure to light, and this charging is good for printing a halftone image.

On the other hand, when a maximum of energy of the exposure to light is 8 erg/cm² (point B), if a characteristic of the photoconductive drum 2 changes a little, the image is printed with stability because the exposing potential almost does not change.

The image forming apparatus of the further embodiment has a function of changing controlling the writing laser power according to a type of the image.

Figure 7:
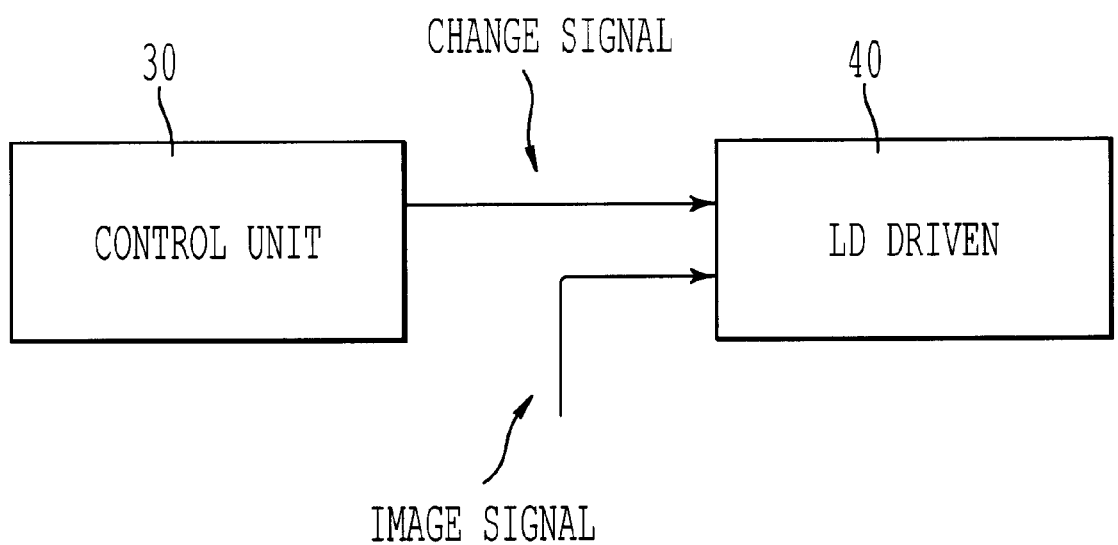
FIG. 7 is a diagram of a part of an image forming apparatus of a further embodiment according to the present invention.

FIG. 7 is a diagram of a part of the image forming apparatus of the further embodiment. A control unit 30 outputs a changing signal to a LD (laser diode) driver 40 according to a setting by a user. When the setting by the user indicates forming an image by a one dot multi-level image or copying, the control unit 30 outputs a changing signal of a logical "H" to the LD driver 40. And when the setting by the user indicates forming an image by binary dots or printing, the control unit 30 outputs a changing signal of a logical "L" to the LD driver 40.

The LD driver 40 is included in the writing unit and drives the laser diode according to the input image signal and the changing signal from the control unit 30.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, an will be apparent to those skilled in the software art. The invention may also be implemented by the preparation of application specific integrated circuit or by interconnecting an appropriate network of conventional components, as will be readily apparent to those skilled in the art.

This application is based on Japanese patent application 9-135314 filed in the Japanese Patent Office on May 26, 1997, Japanese patent application 9-172845 filed in the Japanese Patent Office on Jun. 13, 1997 and Japanese patent application 10-114781 filed in the Japanese Patent Office on Apr. 24, 1998 the entire contents of which are hereby incorporated by reference.

Obviously, numerous additional modifications and variations of the present invention are possible in light of the present teachings. It is therefore to be understood that within the scope of the appended claims, the present invention can be otherwise than as specifically described herein.

What is claimed as new and desired to be secured by Letters Patent of the United States is:

1. An image forming apparatus, comprising:
    writing means for writing an electrostatic image onto a photoconductor by impinging a writing laser light onto the photoconductor;
    resolution setting means for setting an image writing resolution;
    control means for controlling a writing laser power of said writing laser light generated by said writing means according to the image writing resolution set by said resolution setting means and for controlling the writing laser power for a high resolution mode to be greater than the writing laser power for a low resolution mode,
    wherein said control means controls the writing laser power according to an expression:

$$1 < Pb/Pa \leq b/a,$$

wherein
    a: a resolution value of the low resolution mode;
    b: a resolution value of the high resolution mode;
    Pa: a writing laser power for the low resolution mode;
    Pb: the writing laser power for the high resolution mode.

2. An image forming apparatus according to claim 1, wherein said control means controls writing laser light width such that the writing laser light width is narrower than a width calculated according to a number of dots for the high resolution mode.

3. An image forming apparatus according to claim 1, wherein the values a and b are resolution modes in dots per inch.

4. An image forming apparatus, comprising:
- a laser writing unit which writes an electrostatic image onto a photoconductor by impinging a writing laser light onto the photoconductor;
- a resolution controller which sets an image writing resolution;
- a control unit which controls a writing laser power of said writing laser light generated by said laser writing unit according to the image writing resolution set by said resolution controller and which controls the writing laser power for a high resolution mode to be greater than the writing laser power for a low resolution mode, wherein said control unit controls the writing laser power according to an expression:

$$1 < Pb/Pa \leq b/a,$$

wherein
- a: a resolution value of the low resolution mode;
- b: a resolution value of the high resolution mode;
- Pa: a writing laser power for the low resolution mode;
- Pb: the writing laser power for the high resolution mode.

5. An image forming apparatus according to claim 4, wherein said control unit controls writing laser light width such that the writing laser light width is narrower than a width calculated according to a number of dots for the high resolution mode.

6. An image forming apparatus according to claim 4, wherein the values a and b are resolution modes in dots per inch.

* * * * *